Sept. 28, 1965
H. H. HEYDN
3,208,099
SAUSAGE LINKING APPARATUS
Filed Jan. 27, 1964
2 Sheets-Sheet 2
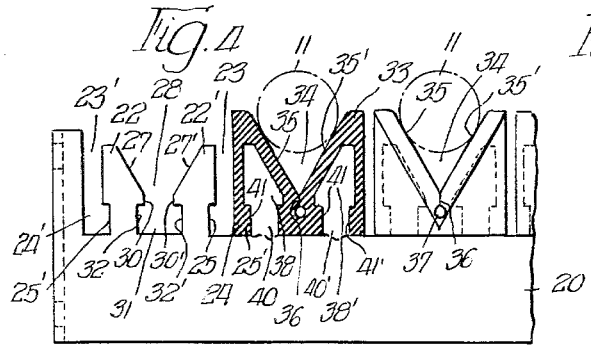
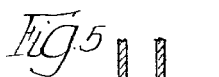
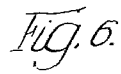
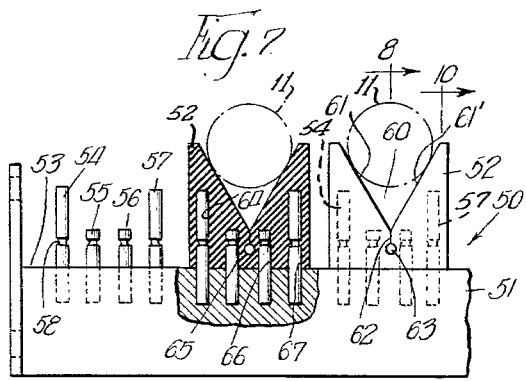
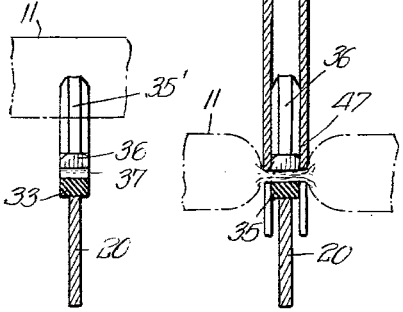
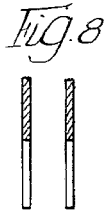
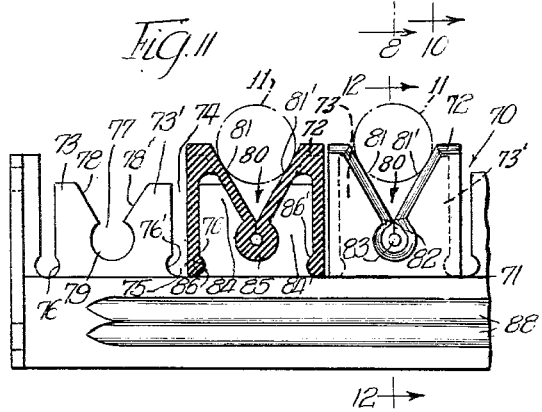
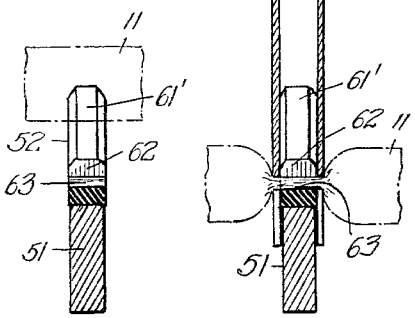
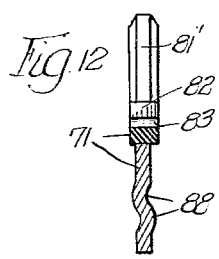
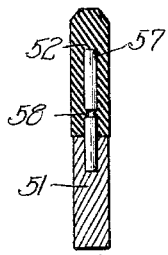
INVENTOR.
Hans H. Heydn,
BY
Grist, Lockwood, Greenawalt & Dewey
attys United States Patent Office
3,208,099
Patented Sept. 28, 1965

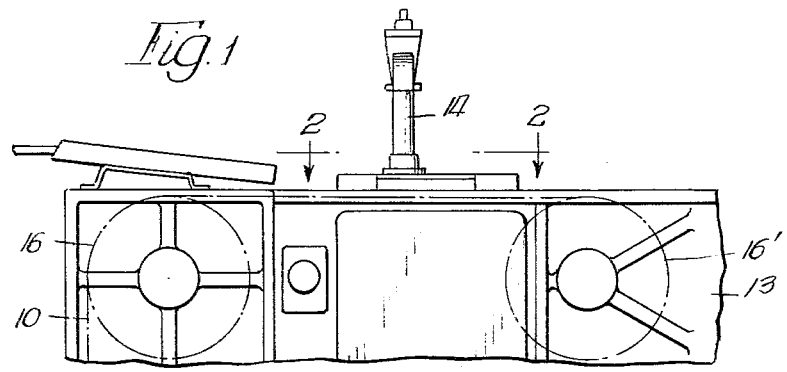
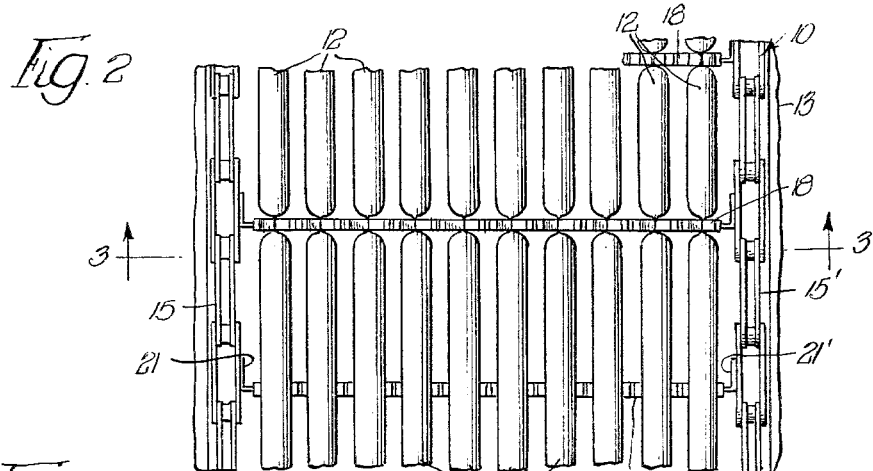
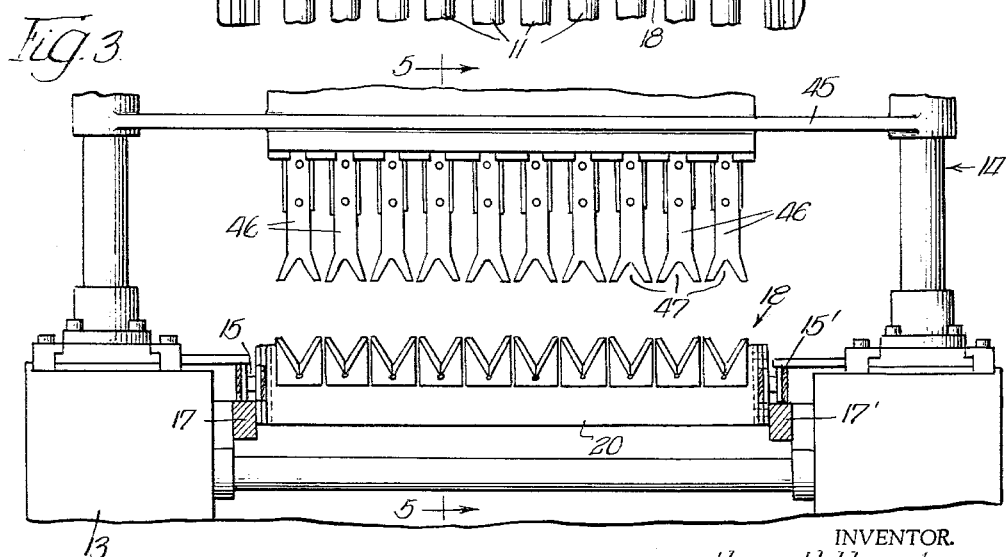

3,208,099
SAUSAGE LINKING APPARATUS
Hans H. Heydn, Madison, Wis., assignor to Oscar Mayer & Co., Inc., Chicago, Ill., a corporation of Illinois
Filed Jan. 27, 1964, Ser. No. 340,236
10 Claims. (Cl. 17—34)

This invention relates to the manufacture of sausages wherein relatively long lengths of filled or stuffed casings are divided into links by constricting the casing at intervals corresponding to the desired length of sausages and the links are advanced in connected relation and in a continuous stream through processing apparatus where they are cooked, smoked and otherwise prepared for marketing.

It is a general object of the invention to provide an improved apparatus for dividing stuffed sausage casings into link forming lengths which is particularly adapted for incorporation in a sausage linking and processing operation of the type disclosed in co-pending application Serial No. 185,167, filed April 4, 1962, and in Patent No. 3,059,272 dated October 23, 1962.

It is a more specific object of the invention to provide in a sausage linking and conveying apparatus of the type in which a plurality of lengths of stuffed casing are fed in parallel paths to a traveling conveyor on which the casings are divided into link forming sections and thereafter advanced to processing chambers, a linking bar assembly for the conveyor which has a plurality of individual casing constricting and holding devices mounted thereon which devices are adapted to be readily removed or replaced so that when an individual device is damaged or there is any malfunction thereof it may be removed from the conveyor without any disassembly of the conveyor and without removal of the entire linking bar assembly.

It is a still further object of the invention to provide a sausage linking machine having a link supporting and carrying conveyor comprising a series of longitudinally spaced cross bars each of which has removably mounted thereon a plurality of casing constricting devices which are aligned longitudinally of the conveyor to permit multiple lines of casing to be divided into sausage link forming lengths which are mounted on the cross bars so that they are readily removable and replaceable without removing or altering the cross bars on which they are supported.

These and other objects and advantages of the invention will be apparent from a consideration of the apparatus which is shown by way of illustration in the accompanying drawings wherein:

FIGURE 1 is an elevation of a portion of a sausage linking and conveying apparatus which embodies the principal features of the invention, the apparatus being shown in part diagrammatically;

FIGURE 2 is a transverse view taken generally on the line 2—2 of FIGURE 1, to an enlarged scale, showing a portion of the linking and carrying conveyor;

FIGURE 3 is a cross section taken generally on the line 3—3 of FIGURE 2, and illustrating one of the link forming cross bar assemblies and associated casing constricting mechanism, with portions thereof broken away;

FIGURE 4 is a fragmentary view, to an enlarged scale, showing one end of a cross bar assembly with portions broken away and other portions shown in section;

FIGURE 5 is a fragmentary cross section taken on the line 5—5 of FIGURE 3;

FIGURE 6 is a fragmentary cross section similar to FIGURE 5 with the elements in the casing constricting position;

FIGURE 7 is a fragmentary elevation of a modified form of the linking bar assembly, the view being similar to FIGURE 4 and having portions broken away and other portions shown in section;

FIGURE 8 is a fragmentary cross section taken on the line 8—8 of FIGURE 7 and showing the casing constricting mechanism;

FIGURE 9 is a fragmentary cross section similar to FIGURE 8 with the elements in the casing constricting position;

FIGURE 10 is a fragmentry section taken on the line 10—10 of FIGURE 7;

FIGURE 11 is a fragmentary elevation of one end of a cross bar assembly showing a further modification thereof, the view being similar to FIGURE 4; and FIGURE 12 is a fragmentary cross section taken on the line 12—12 of FIGURE 11.

Referring to FIGURES 1 and 2 of the drawings, there is illustrated a portion of a continuously traveling endless chain conveyor 10 which forms a link receiving and supporting conveyor for an apparatus which is adapted to divide a plurality of lengths of stuffed sausage casing 11 into link forming sections 12 and thereafter process the sausage links in a continuous operation. The conveyor 10 is an improvement over a similar conveyor in the link forming and processing apparatus illustrated in co-pending application Serial No. 185,167, to which reference may be had for details of the apparatus not hereinafter described.

The conveyor 10 has a horizontally disposed upper run or stretch at one end of the apparatus which is supported on an upright frame 13 (FIGURES 1 to 3) the latter also supporting a frame 14 which extends in a vertical transverse plane above the upper run of the conveyor 10 and on which there is mounted for vertical reciprocation a cross bar having a plurality of devices which cooperate with casing gathering and constricting devices on the conveyor 10 for dividing each of a plurality of lengths of stuffed sausage casings 11, which are fed thereto in parallel, laterally spaced relation, into a connected series of link forming sections 12, which link forming sections 12 are held on the conveyor 10 and subsequently carried through the processing chamber or chambers by advancing movement of the conveyor 10.

The conveyor 10 on which the sausage links 12 are formed and carried comprises a pair of endless chains 15 and 15' (FIGURES 2 and 3) which are arranged in transversely spaced, parallel relation and supported on suitable sprockets spaced throughout the apparatus, two of the sprockets being shown at 16 and 16' in FIGURE 1. The chains 15 and 15' are supported on guide rails 17 and 17' on the sides of the support frame 13 at the linking station where the upper run of the conveyor 10 travels in a horizontal path. A plurality of cross bar assemblies 18 are carried between the chains 15 and 15' in longitudinally spaced relation, with the spacing between the assemblies 18 corresponding to the length desired for the links 12.

Each of the cross bar assemblies 18 comprises a single plate-like support bar 20 which is attached at its oppoiste ends to the chains 15 and 15' by the angle brackets 21 and 21'. The support bars 20 are arranged in transversely extending, longitudinally spaced, parallel relation on the chains 15 and 15' with the longitudinal spacing determined by the size links desired. Each of the support bars 20 (FIGURES 4 to 6) is notched along its upper edge to provide upwardly extending pairs of insert supporting wings or fingers 22 and 22', with the fingers of each pair thereof being of identical shape except for being rights and lefts. The pairs of fingers 22 and 22' are separated from each other across the length of the bar by vertically extending slots 23 and from the end portions of the bar by slots 23', with each of the slots 23 and 23' having a widened portion 24 and 24' at the base thereof. The widened portions 24 and 24' provide recesses 25 and 25' in oppositely disposed confronting relation which are cut into the opposed vertical edges at the base of the wings or fingers 22 and 22'. The wings or fingers 22 and 22' of each pair thereof are spaced from each other and have oppositely disposed, upwardly diverging edges 27 and 27' which define between them an upwardly opening, generally V-shaped slot 28. The inclined edges 27 and 27' terminate at their bottom ends at relatively short spaced vertical edge portions 30 and 30' with the latter terminating at the top of a rectangular shaped pocket 31, the opposite ends of which extend into the base of the wings 22 and 22' so as to form therein recesses 32 and 32'.

Each pair of wings or fingers 22 and 22' is adapted to support on the bar 20 a casing gathering and constricting device 33 which is in the form of a removable insert and which is made of rubber, synthetic rubber or similar material molded on a suitable form or molding die so as to provide, when seated on the bar 20, an upwardly opening V-shaped slot 34 which is defined by downwardly inclined converging edges 35 and 35' which edges 35 and 35' have substantial width. The edge walls 35 and 35' terminate at the upper end of a vertical slit 36 of relatively short length which slit 36 provides an entrance to a circular pocket 37 at the bottom end of the slit. The insert 33 is formed with downwardly opening pockets 38 and 38' which are adapted to receive a pair of attaching and supporting members in the form of wings or fingers 22 and 22' on the support bar 20. The pockets 38 and 38' have constricted openings 40 and 40' which are defined by oppositely disposed projecting portions 41 and 41' of the material. The projecting portions 41 and 41' are adapted to seat in the recesses 25, 25' and 32, 32' so as to lock the insert 33 in proper position on the bar 20.

In using the apparatus, the lengths of stuffed casing 11 are fed so that they are laid in the V-shaped slots defined by the edges 35, 35' of the neck forming or casing constricting devices 33 and the successive cross bar assemblies 18 are advanced by movement of the conveyor 10 to the linking station where they are disposed beneath the vertically reciprocating cross bar 45 (FIGURES 1 and 3) on the frame 14 which has a plurality of pairs of depending plates 46 with downwardly opening V-shaped slots 47 in the lower ends thereof. The slots 47 are vertically aligned with the V-shaped slots 34 in the casing constricting devices 33 and the cross bar 45 is reciprocated vertically by a suitable mechanism (not shown). The neck forming plates 46 are moved into straddling relation with the casing constricting devices 33 on each successive cross bar assembly 18 on the conveyor 10 and move downwardly a sufficient distance so as to force the stuffed casings down through the slots 36 into the necking pockets 37 of the casing constricting and holding devices 33 where the constricted portions of the casings are held in the pockets 37 of the devices 33 while the plates 46 are raised and the conveyor 10 advances the links 12 beyond the linking station and through the processing apparatus.

A modified form of cross bar assembly is illustrated in FIGURES 7 to 10. In this form of the apparatus, the cross bar assembly 50 comprises a plate-like supporting bar 51 and a plurality of casing constricting or neck forming devices 52 mounted in spaced relation on the top edge 53 of the bar 51. The bar 51 is provided with a plurality of groups of four pins 54, 55, 56 and 57 constituting attaching and supporting members for attaching thereto the neck forming devices 52. The two outside pins 54 and 57 are somewhat longer than the two inside pins 55 and 56 and each of the pins has a circumferential groove 58. The pins are arranged in spaced upstanding relation on the bar edge 53 as shown in FIGURE 7. The constricting devices 52 are in the form of removable inserts made of molded rubber or similar material having substantial resiliency and are shaped so that when they are mounted on the bar 51 they provide an upstanding V-shaped opening 60 defined by upwardly inclined or upwardly diverging edge portions 61 and 61'. The slot forming edges 61 and 61' terminate at their lower ends at a slit formation 62 which in turn extends to a small circular pocket 63 at the lower edge thereof. Each casing constricting or necking device 52 has substantial thickness and is provided with parallel tubular pockets 64, 65, 66 and 67 which are formed therein to receive the pins 54, 55, 56 and 57 so that the devices are mounted on the bar 51 by engaging the pins 54, 55, 56 and 57 in the pockets 64, 65, 66 and 67 as shown in FIGURE 7. Each of the pockets 64, 65, 66 and 67 has an internal peripheral shoulder for engaging in the groove 58 in the respective pin to serve as a locking and positioning means.

The modified form 50 of the cross bar assembly operates in the same manner as the form thereof illustrated in FIGURES 4 to 6. The casing constricting or necking devices 52 are adapted to be removed from the bar 51 when replacement is required because of damage or for any other reason.

A further modified form of link forming cross bar assembly is illustrated in FIGURES 11 and 12. In this form of the apparatus the cross bar assembly 70 includes a plate-like supporting bar 71 and a plurality of casing constricting and necking devices 72 which are in the form of inserts and which are removably mounted on the bar 71. The bar 71 is notched along its upper margin to provide supporting wings, tongues or fingers 73 and 73' constituting attaching and supporting members for the necking devices 72. The supporting tongues or fingers 73 and 73' are shaped as shown in FIGURE 11 with each pair thereof being separated from the adjoining pair by a vertically extending slot 74 which terminates at its lower end in a pocket 75 having portions 76 and 76' extending into the adjoining tongues 73 and 73' so as to form pockets therein. The two tongues 73 and 73' are spaced to provide a generally V-shaped slot 77 which is defined by downwardly converging side edges 78 and 78' with the latter having their lower ends terminating at a circular recess 79.

The casing constricting devices 72 are formed with an upwardly opening V-shaped slot 80 which is defined by the side edge portions 81 and 81' with the latter being in the form of downwardly converging tapered edges having substantial width which terminate at a vertically extending slit 82 leading to a small circular or tubular pocket 83. The devices 72 are formed with downwardly opening recesses 84 and 84' which are shaped to receive the supporting tongues or fingers 73 and 73' on the base or support plate 71. The casing constricting devices 72 are provided with a center portion 85 surrounding the pocket 84 which is adapted to seat in the circular recess 79 and also with projections 86 and 86' which are adapted to seat in the recesses 76 and 76' at the base of the tongues 73 and 73' so as to effectively lock the devices 72 to the cross bar 71. The cross bar 71 is shaped at 88 with ridge formations to reinforce the same.

While particular materials and specific details of construction are referred to in describing the forms of the apparatus which are illustrated, it will be understood that other materials and different structural details may be resorted to within the spirit of the invention.

I claim:

1. In a machine for linking stuffed sausage casing, a traveling conveyor having cross bar assemblies which are spaced a distance apart corresponding to the length of link desired, said cross bar assemblies each comprising a supporting cross bar member having individual casing constricting and holding members mounted in spaced relation along the outer margin thereof, each of said casing constricting and holding members being formed of molded rubber-like material and constructed so as to provide, when mounted on said supporting cross bar member, an outwardly opening, V-shaped slot defined by inwardly converging tapered edges which terminate at a small slit extending to a neck-retaining cylindrical pocket of relatively small size whereby a stuffed casing may be forced into the slot and through the slit so as to constrict the casing and position the neck thus formed in the pocket, said casing constricting and holding member having recesses opening on the edge which is opposite the V-shaped slot, and said supporting cross bar member having spaced support members projecting along its outer margin which seat in said recesses so as to retain the casing constricting and holding member in frictionally locked position on said supporting cross bar member.

2. In a machine for linking stuffed sausage casing, a traveling conveyor having cross bar assemblies which are spaced apart longitudinally of the conveyor a distance corresponding to the length of link desired, said cross bar assemblies each comprising a generally rectangular plate-like supporting bar member having a plurality of individual casing constricting and neck retaining devices mounted in side-by-side relation along the outermost margin thereof, each of said casing constricting and neck retaining devices being in the form of a rectangular plate-like insert of molded rubber-like material which is constructed with a V-shaped slot opening outwardly of the one edge and a pair of internal recesses opening on the opposite edge, said V-shaped slot being defined by a pair of inwardly converging edge portions which terminate at a relatively short slit leading into a neck retaining cylindrical pocket forming recess of relatively small diameter which opens on opposite faces of the insert, said supporting bar member having pairs of tongue-like attaching members spaced along its outer margin which tongue-like members conform to the shape of the internal recesses in the inserts and which are adapted to be received in said recesses when the inserts are mounted on the supporting bar member thereby to frictionally retain said inserts in position thereon.

3. In a machine for linking stuffed sausage casing, a traveling conveyor having cross bar assemblies which are spaced apart longitudinally of the conveyor a distance corresponding to the length of link desired, said cross bar assemblies each comprising a generally rectangular plate-like supporting bar member having a plurality of individual casing constricting and neck retaining devices mounted in side-by-side relation along the outermost marginal edge thereof, each of said casing constricting and neck retaining devices being characterized by a rectangular plate-like insert of molded rubber-like material which is formed to provide a V-shaped slot opening outwardly of the one edge and a pair of internal recesses opening on the oppositely disposed edge, said V-shaped slot providing inwardly converging edge portions which terminate at a relatively short slit leading into a small neck retaining pocket, said slit and said neck retaining pocket extending between opposite faces of said insert, said supporting bar member having tongue-like insert supporting members spaced along its outer margin which insert supporting members conform to and have substantially the same shape as the recesses in the inserts so that they are seated in said recesses when the inserts are mounted on said supporting bar member and frictionally retain said inserts in position thereon.

4. In a machine for linking stuffed sausage casings, a traveling conveyor having longitudinally spaced cross bar assemblies with the longitudinal spacing corresponding to the length of link desired, said cross bar assemblies each comprising a generally rectangular plate-like supporting bar member having a plurality of individual casing constricting and neck retaining devices mounted in side-by-side relation along the outermost marginal edge thereof, each of said casing constricting and neck retaining devices being characterized by a rectangular insert of molded rubber-like material which provides a V-shaped slot opening outwardly of the one edge and a pair of internal recesses opening on the oppositely disposed edge, said V-shaped slot providing narrow, inwardly converging wall portions which terminate at a relatively short slit leading into a small neck retaining pocket, said slit and said neck retaining pocket extending transversely through said insert, said supporting bar member having tongue-like support members spaced along its outer margin which conform to and have substantially the same shape as the recesses in the inserts so that they are received in said recesses when the inserts are mounted on said supporting bar member and frictionally retain said inserts in position thereon.

5. In a machine for linking stuffed sausage casing, a traveling conveyor having cross bar assemblies which are spaced apart lengthwise of the conveyor a distance equal to the length of link desired, said cross bar assemblies each comprising a generally rectangular plate-like supporting bar member having a plurality of individual casing constricting and neck retaining devices mounted in side-by-side relation along the outermost marginal edge thereof, each of said casing constricting and neck retaining devices being a rectangular insert of molded rubber-like material which is formed to provide a V-shaped slot opening on the one edge and internal recesses opening on the oppositely disposed edge, said V-shaped slot being defined by inwardly tapering narrow wall portions which terminate at relatively short narrow wall portions in confronting relation and forming a slit-like passageway leading into a small cylindrical neck retaining pocket, said passageway and said neck retaining pocket extending between opposite faces of said insert, said supporting bar member having insert supporting tongues spaced along its outer margin which tongues substantially conform to the shape of the recesses in the inserts so that said tongues are seated in said recesses when the inserts are mounted on said supporting bar member and means on the tongues and the inserts which co-operate to frictionally retain said inserts thereon.

6. In a machine for linking stuffed sausage casing, a traveling conveyor having cross bar assemblies which are spaced apart lengthwise of the conveyor a distance equal to the length of link desired, said cross bar assemblies each comprising a generally rectangular plate-like support bar having a plurality of individual casing constricting and neck retaining devices mounted in side-by-side relation along the outermost marginal edge thereof, each of said casing constricting and neck retaining devices being a rectangular plate-like insert of molded rubber-like material which is formed to provide a V-shaped slot opening on the one edge and internal recesses opening on the oppositely disposed edge, said V-shaped slot providing inwardly converging narrow edges which terminate at relatively short narrow wall sections forming a slit leading into a small neck retaining pocket, said slit and said neck retaining pocket extending between opposite flat outer faces of said insert, said supporting bar member having tongue-like insert mounting members spaced along its outer margin which insert mounting members conform to the shape of the recesses in the inserts and are seated in said recesses when the inserts are mounted on said supporting bar member, said shoulder forming portions engaging with co-operating portions in said recesses for frictionally retaining said inserts thereon.

7. In a machine for linking stuffed sausage casing, a traveling conveyor having cross bar assemblies which are spaced a distance apart corresponding to the length of link desired, said cross bar assemblies each comprising a supporting cross bar member having individual casing constricting and holding members mounted in spaced relation along the outer margin thereof, each of said casing constricting and holding members being formed of molded rubber-like material and constructed so as to provide, when mounted on said supporting cross bar member, a rectangular plate member with an outwardly opening, V-shaped casing gathering slot defined by narrow inwardly converging edges which terminate at a small necking slit extending to a cylindrical pocket of relatively small size whereby a stuffed casing may be forced into the slot and through the slit so as to gather the casing and position the neck thus formed in the pocket, said casing constricting and holding member having internal recesses opening on the edge which is opposite the V-shaped slot, and said supporting cross bar member having transversely projecting pairs of support members spaced along its outer margin which seat in said recesses so as to retain the casing constricting and holding members in locked position on said supporting cross bar member.

8. In a machine for linking stuffed sausage casing, a traveling conveyor having casing constricting and holding assemblies which are spaced apart longitudinally of the conveyor a distance corresponding to the length of link desired, said assemblies each comprising a generally rectangular plate-like cross bar member having a plurality of individual neck forming and retaining devices mounted in side-by-side relation along a marginal portion of the cross bar member which extends outboard of the path of the conveyor, each of said neck forming and retaining devices comprising a rectangular plate-like insert of molded rubber-like material having a thickness greater than the thickness of said cross bar member and constructed with a V-shaped slot opening outwardly of the one edge, said insert having internal recesses opening on the opposite edge, said V-shaped slot being defined by inwardly converging edge portions which terminate at a relatively short slit forming portion, said slit forming portion providing an expansible entrance passageway into a neck retaining cylindrical pocket of relatively small diameter, said cross bar member having attaching tongue members spaced along its outboard margin which tongue members are shaped to fit into the internal recesses in the inserts so that the inserts may be forced over the tongue members and frictionally retained thereon in position to receive in the V-shaped slots casing portions which may be forced down into the slots and through the slits into the neck retaining pockets.

9. In a machine for linking stuffed sausage casing, a traveling conveyor having casing constricting and holding assemblies which are spaced apart longitudinally of the conveyor a distance corresponding to the length of link desired, said assemblies each comprising a generally rectangular plate-like cross bar member having a plurality of individual neck forming and retaining devices mounted in side-by-side relation along a marginal portion of the cross bar member which extends outboard of the path of the conveyor, each of said neck forming and retaining devices comprising a rectangular plate-like insert of molded rubber-like material having a V-shaped slot opening outwardly of the one edge, each said insert having a plurality of internal recesses opening on the opposite edge, said V-shaped slot being defined by inwardly converging edge portions which terminate at a relatively short slit forming portion, said slit forming portion providing an expansible entrance passageway into a neck retaining, generally cylindrical pocket of relatively small diameter, said cross bar member having insert attaching and supporting members spaced along its outboard margin which attaching and supporting members are shaped to fit into the internal recesses in the inserts so that the inserts may be forced over said attaching and supporting members and frictionally retained thereon in position to receive in the V-shaped slots casing portions which may be forced down into the slots and through the slits into the neck retaining pockets.

10. In a machine as recited in claim 9, and said insert attaching and supporting members comprising post-like formations having peripheral grooves adapted to cooperate with rib formations provided in the internal recesses of the inserts for frictionally holding the inserts in position on the cross bar member while enabling the individual inserts to be readily removed for replacement.

References Cited by the Examiner

UNITED STATES PATENTS

| | | | |
|---|---|---|---|
| 2,581,183 | 1/52 | Galamb | 17—11.1 |
| 3,042,963 | 7/62 | Runge | 17—34 |
| 3,059,272 | 10/62 | Millenaar | 17—34 |

SAMUEL KOREN, *Primary Examiner.*

LUCIE H. LAUDENSLAGER, *Examiner.*